(12) United States Patent
Elman (10) Patent No.: US 7,250,200 B2
(45) Date of Patent: *Jul. 31, 2007

(54) LIQUID CRYSTAL CELL WITH COMPENSATOR LAYER AND PROCESS

(75) Inventor: James F. Elman, Fairport, NY (US)

(73) Assignee: Nitto Denko Corporation, Ibaraki-shi (JP)

( * ) Notice: Subject to any disclaimer, the term of this patent is extended or adjusted under 35 U.S.C. 154(b) by 244 days.

This patent is subject to a terminal disclaimer.

(21) Appl. No.: 10/859,702

(22) Filed: Jun. 3, 2004

(65) Prior Publication Data

US 2004/0223103 A1 Nov. 11, 2004

Related U.S. Application Data

(63) Continuation-in-part of application No. 10/431,765, filed on May 8, 2003, now Pat. No. 6,853,424, which is a continuation-in-part of application No. 10/211,467, filed on Aug. 2, 2002, now abandoned.

(51) Int. Cl.
*G02F 1/13363* (2006.01)

(52) U.S. Cl. ............... 428/1.3; 428/1.1; 349/117; 349/118; 349/119; 349/120; 349/121; 427/162; 427/163.3

(58) Field of Classification Search ........ 428/1.3–1.33; 349/117–121
See application file for complete search history.

(56) References Cited

U.S. PATENT DOCUMENTS

| | | | | |
|---|---|---|---|---|
| 5,189,538 A | * | 2/1993 | Arakawa | 349/120 |
| 5,245,456 A | * | 9/1993 | Yoshimi et al. | 349/118 |
| 5,717,474 A | * | 2/1998 | Sarma | 349/85 |
| 5,750,641 A | * | 5/1998 | Ezzell et al. | 528/353 |
| 6,411,344 B2 | * | 6/2002 | Fujii et al. | 349/12 |
| 6,512,561 B1 | * | 1/2003 | Terashita et al. | 349/118 |
| 6,822,713 B1 | * | 11/2004 | Yaroshchuk et al. | 349/117 |
| 6,853,424 B2 | * | 2/2005 | Elman et al. | 349/117 |
| 6,937,310 B2 | * | 8/2005 | Elman et al. | 349/118 |
| 6,964,795 B2 | * | 11/2005 | Elman et al. | 428/1.3 |
| 6,995,395 B2 | * | 2/2006 | Elman et al. | 257/59 |
| 2003/0219549 A1 | | 11/2003 | Shimizu | 428/1.1 |

FOREIGN PATENT DOCUMENTS

| | | |
|---|---|---|
| JP | 2003-226763 | 8/2003 |
| JP | 2003-231143 | 8/2003 |

OTHER PUBLICATIONS

James Elman, Declaration under Rule 132, dated Nov. 21, 2005, from correlated U.S. Appl. No. 10/631,152.*
Arthur Kluegel, Remarks section dated Nov. 21, 2005, from correlated U.S. Appl. No. 10/631,152.*

* cited by examiner

*Primary Examiner*—Rena Dye
*Assistant Examiner*—Sow-Fun Hon
(74) *Attorney, Agent, or Firm*—Westerman, Hattori, Daniels & Adrian, LLP.

(57) ABSTRACT

Disclosed is a liquid crystal cell including one or more compensator layers interposed between a constraint and liquid crystal. Each compensator layer contains a transparent amorphous polymeric birefringent material having an out-of plane birefringence more negative than −0.005 or more positive than +0.005.

15 Claims, 7 Drawing Sheets

LIQUID CRYSTAL CELL WITH COMPENSATOR LAYER AND PROCESS

CROSS-REFERENCE TO RELATED APPLICATION

This application is a continuation-in-part of U.S. Ser. No. 10/431,765 filed May 8, 2003, now U.S. Pat. No. 6,853,424 which is continuation-in-part of U.S. Ser. No. 10/211,467 filed Aug. 2, 2002, now abandoned the contents of both of which are incorporated herein by reference.

FIELD OF THE INVENTION

The present invention generally relates to optical compensation films, to liquid crystal displays containing optical compensation films, and to processes of forming a liquid crystal cell.

BACKGROUND OF THE INVENTION

Triacetylcellulose (TAC, also called cellulose triacetate) film has traditionally been used by the photographic industry due to its unique physical properties and flame retardance. TAC film is also the preferred polymer film for use as a cover sheet for the polarizers used in liquid crystal displays. It is the preferred material for this use because of its extremely low in-plane birefringence. Its out of plane birefringence is also small (but not zero), and is useful in providing some optical compensation to the LCD.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that all the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because we are dealing with such amorphous polymeric materials, the following definitions refer to this measured birefringence and not intrinsic birefringence.

"In-plane birefringence" means the difference between $n_x$ and $n_y$, where x and y lie in the plane of the layer. $n_x$ will be defined as being parallel to the casting direction of the polymer, and $n_y$ being perpendicular to the casting direction of the polymer film. The sign convention used will be $n_x-n_y$.

"Out-of-plane birefringence" means the difference between $n_z$ and the average of $n_x$ and $n_y$, where x and y lie in the plane of the layer and z lies in the plane normal to the layer. The sign convention used will be: $n_z-[(n_x+n_y)/2]$. TAC typically has a negative out of plane birefringence as its $n_z$ is smaller than its $n_x$ and $n_y$.

"In-plane retardation (Re)" means the product of in-plane birefringence and layer thickness (t). Thus $Re=t(n_x-n_y)$ "Out-of-plane retardation (Rth)" means the product of out-of-plane birefringence and layer thickness (t). Thus $Rth=t(n_z-[(n_x+n_y)/2])$.

Synthetic polymer films (such as polycarbonate or polysulfone) are often used to enhance the minimal optical compensation that TAC provides. These synthetic polymers films are attached to the rest of the display by adhesive lamination.

Generally in the field of optical materials, the synthetic polymer film is used as an optically anisotropic film (having a high retardation value), while a TAC film is used as an optical isotropic film (having a low retardation value).

Japanese Published Patent Application JP1999-95208 describes a liquid crystal display having an optical compensator (having high retardation) prepared by uniaxial stretching of a high polymer film. Such polymers include polyesters, polycarbonate or polysulfone. This stretching step is essential to obtain the desired optical properties. This stretching affects both in- and out-of-plane retardation simultaneously. These two orthogonal retardations cannot be independently controlled by this method. Also, producing uniform optical compensators by this method is described as being difficult. This application also describes a compensator where the inventor uses an exfoliated inorganic clay material in a polymeric binder coated on top of a TAC support. The exfoliated inorganic clay material in this layer is the optically active material, not the polymeric binder.

World patent WO 01/31394 A2 discusses the use of the color filter array layer as a source of additional out-of-plane retardation for a liquid crystal display. The color filter array is located within the constraints of the liquid crystal cell. The use of an aromatic polyimide binder rather than a polyacrylate binder for the color filter array dyes provides enhanced retardation. The overall retardation is achieved with the combination of the color filter array retarder plus optional additional out-of-plane retardation from the TAC used as a supporting member for the polarizers.

The proposal to select the binder for the color filter array with retardation in mind has an advantage versus polarizer-based retarders that are laminated to the liquid crystal cell: mechanical stresses to the display induced by room condition changes or perhaps direct shock can cause polarizer-based retarders to move relative to the liquid crystal cell. Retarders coated directly on the glass substrate are more rigidly held in registry with the cell, and thus do not suffer this problem. However the requirement that this color filter array be also a retarder means that this layer must serve two purposes: color filtering and adding retardation. This limits the potential thickness to be considered for this layer. This layer must also be pixilated, and this adds additional complications. Finally it is taught on the internal surface of the constraint only, where the color filter array is located.

It is a problem to be solved to provide a liquid crystal cell that is readily manufactured and that readily provides the required degree of in-plane and out-of-plane compensation while reducing the problems associated with a laminated compensator.

SUMMARY OF THE INVENTION

The invention provides a liquid crystal cell including one or more compensator layers interposed between a constraint and liquid crystal. Each compensator layer contains a transparent amorphous polymeric birefringent material having an out-of plane birefringence more negative than −0.005 or more positive than +0.005. The invention also provides a liquid crystal display and a process for preparing a liquid crystal display.

The invention cell is readily manufactured and provides the required degree of in-plane and out-of-plane compensation.

BRIEF DESCRIPTION OF THE DRAWINGS

FIG. 4A illustrates a wide-angle X-ray diffraction pattern for the transmission mode of a highly ordered, non-amorphous material, and.

DETAILED DESCRIPTION OF THE INVENTION

The invention is summarized above.

The present invention is not limited by the requirements of WO 01/31394 mentioned above.

The present invention provides a liquid crystal cell having contiguous to at least one surface of a constraint thereof a compensator layer containing a birefringent amorphous polymeric material having an out-of plane birefringence more negative than −0.005 or more positive than 0.005.

Figure 4A:
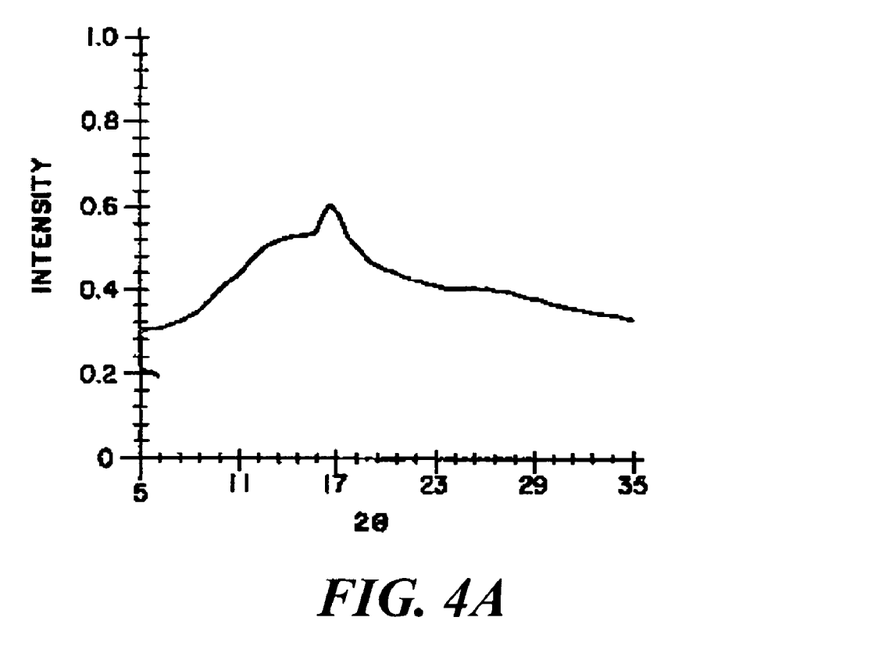
Figure 4B:
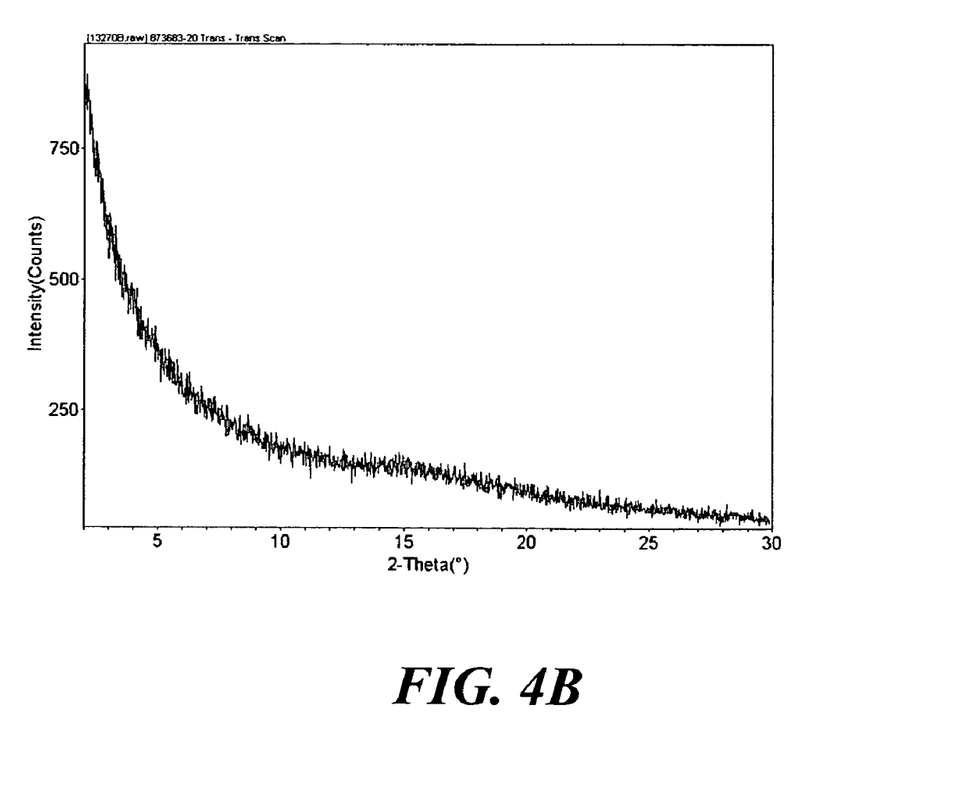
FIG. 4B is a wide-angle X-ray diffraction pattern for the transmission mode of an amorphous polymer of the present invention.

"Amorphous" means a lack of long-range order. Thus an amorphous polymer does not show long-range order as measured by techniques such as X-ray diffraction. This is demonstrated, by example only, by the contrasting graphic characteristics illustrated in FIGS. 4A and 4B. FIG. 4A illustrates a wide-angle X-ray diffraction pattern (transmission mode) of a rigid rod polymer, specifically a (BPDA-TFNB)$_{0.5}$–(PMDA-TFMB)$_{0.5}$ polyimide as referenced in U.S. Pat. No. 5,344,916. FIG. 4B is a wide-angle X-ray diffraction pattern (transmission mode) of an amorphous polymer of the present invention [poly(4,4'-hexafluoroisopropylidene-bisphenol-co-4,4'-(2-norbornylidene) bisphenol) terephthalate-co-isophthalate].

As used herein, constraints are transparent substrates used as the two principal supporting members of the LC cell (typically glass) that sandwich the switchable liquid crystal layer (and typically the color filter array, black matrix, and thin film transistor, alignment and electrode layers, and other optional layers) and are normally at least 10 micrometers thick. The term "transparent" is used in its normal sense to mean a layer that absorbs little or no visible light.

Each constraint may be defined by a single continuous layer of material (such as glass), or by multiple layers (such as glass and binder, for example). The liquid crystal cell referred to herein extends from the external surface of one constraint to the other, including any compensator layer. In certain embodiments herein, the compensator layer is "in-cell", meaning that the compensator is located between the constraints of the liquid crystal cell.

Figure 1A:
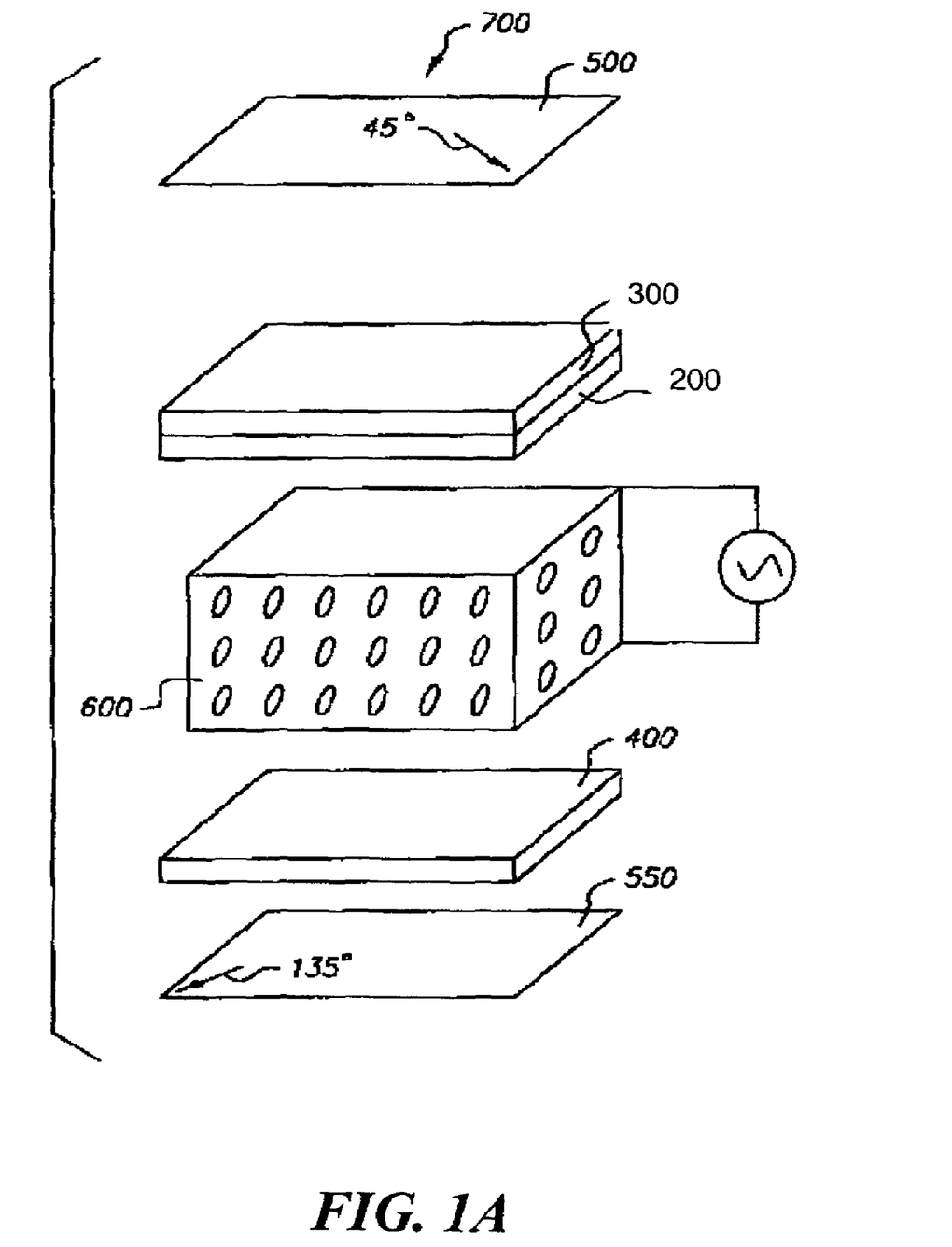
FIG. 1A is an exploded view schematic of a liquid crystal display with one amorphous polymeric compensator layer of the invention.

FIG. 1A shows a liquid crystal display 700 according to an embodiment of the invention. The display 700 includes an amorphous polymeric compensator layer 200, a constraint 300 with alignment layer/TFT (thin film transistor) layer/color filter array on one side of the electrically switchable liquid crystal 600, a second constraint 400 with alignment layer/TFT layer which is on the other side of the electrically switchable liquid crystal 600, and polarizers 500 and 550. The transmission axes of polarizers 500 and 550 form a 90°±10° angle relative to each other. The angles of their transmission axes are denoted as 45° and 135° relative to the liquid crystal display 700. However, other angles are possible depending on the kind of liquid crystal display 700 and this is obvious to those who skilled in the art.

Figure 1B:
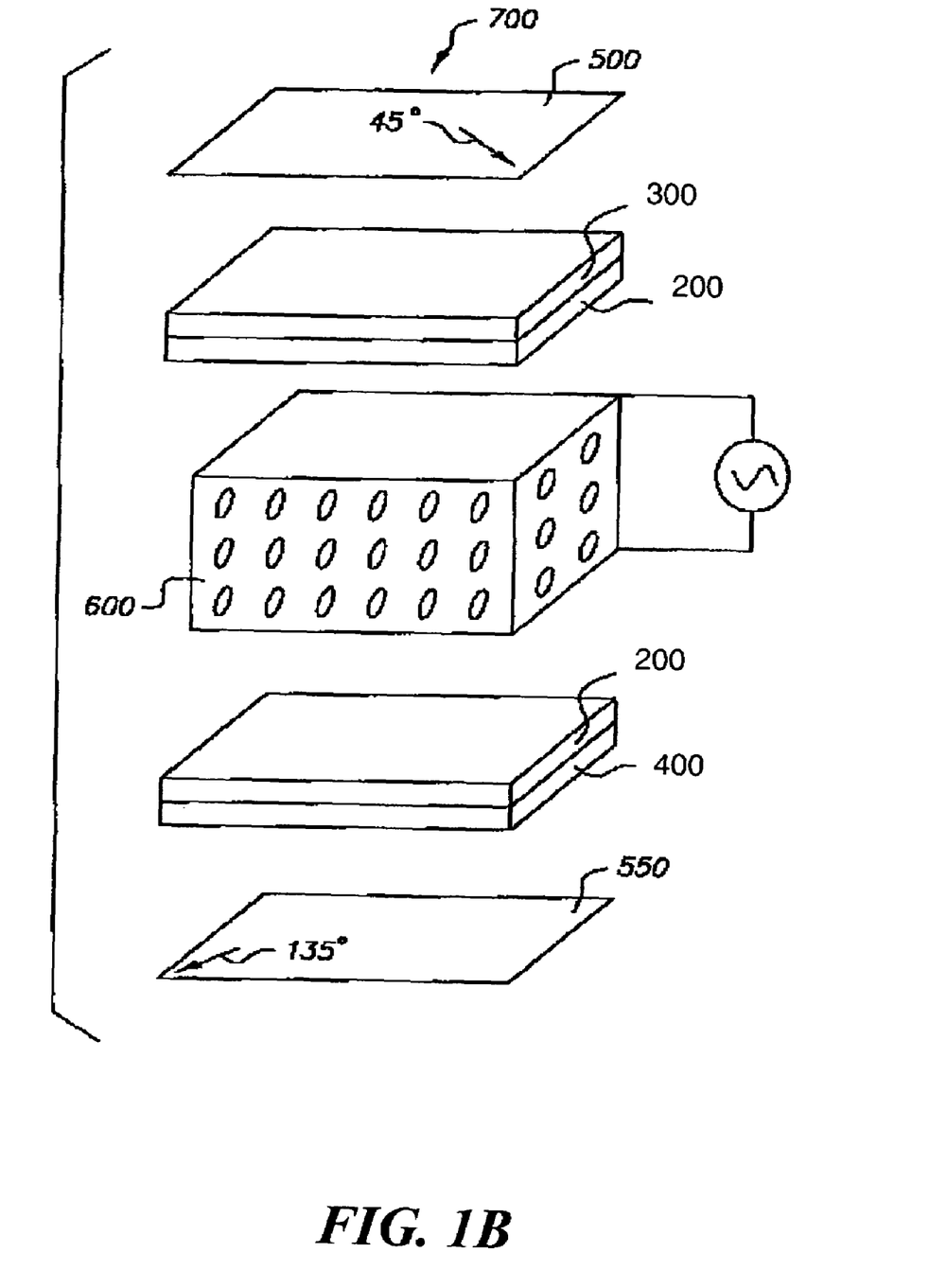
FIG. 1B is an exploded view schematic of a liquid crystal display with two amorphous polymeric compensator layers of the invention.

FIG. 1B shows a liquid crystal display 700 according to another embodiment of the invention. The display 700 includes two amorphous polymeric compensator layers 200, a constraint 300 with alignment layer/TFT layer/color filter array on one side of the electrically switchable liquid crystal 600, a second constraint 400 with alignment layer/TFT layer which is on the other side of the electrically switchable liquid crystal 600, and polarizers 500 and 550. The transmission axes of polarizers 500 and 550 form a 90°±10° angle relative to each other. The angles of their transmission axes are denoted as 45° and 135° relative to the liquid crystal display 700. However, other angles are possible depending on the kind of liquid crystal display 700 and this is obvious to those who skilled in the art.

Figure 2A:
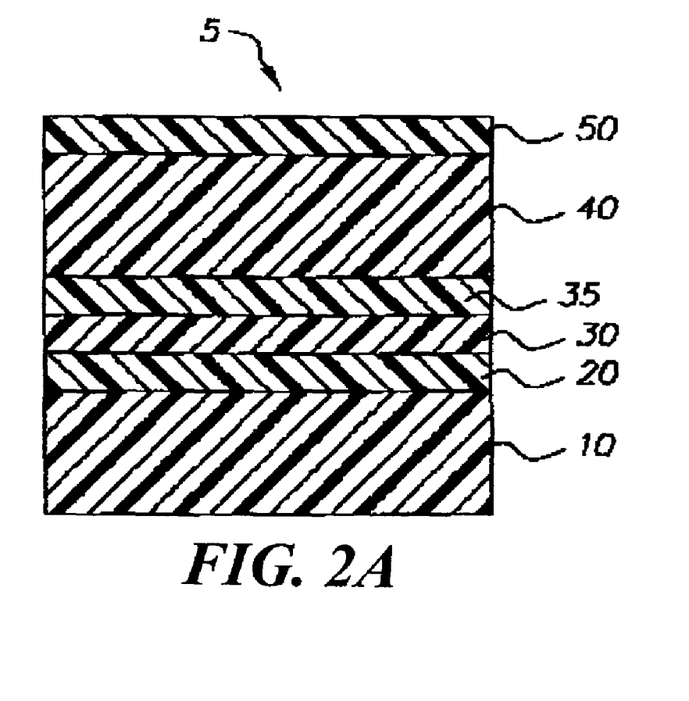
FIG. 2A is a cross-sectional schematic of an embodiment of the invention with the amorphous polymeric compensator layer on the side of the constraint opposite the liquid crystal.

FIG. 2A shows a cross-sectional schematic of part of a liquid crystal display 5 including an amorphous polymeric compensator layer 50 and constraint 40 in accordance with an embodiment of the present invention. Also shown are the switchable liquid crystal 10, an alignment layer 20, a TFT (thin film transistor) layer 30, and a color filter array 35.

Figure 2B:
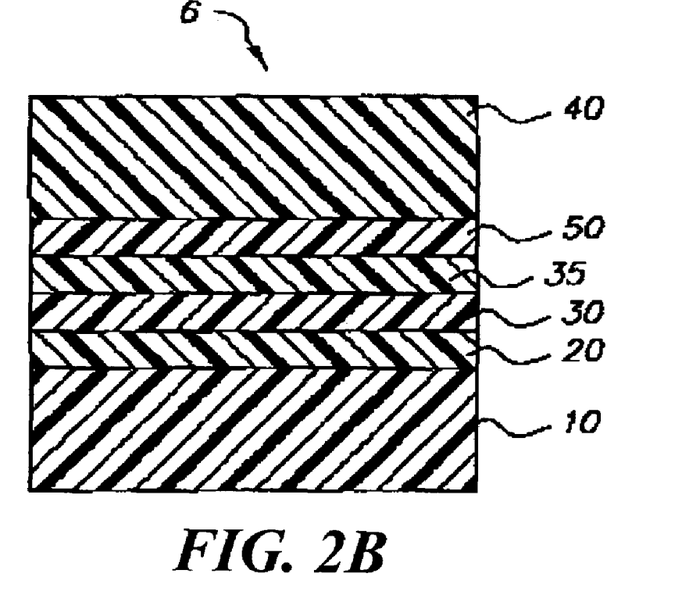
FIG. 2B is a cross-sectional schematic of an embodiment of the invention with the amorphous polymeric compensator layer on the side of the constraint adjacent to the liquid crystal.

FIG. 2B shows a cross-sectional schematic of part of another liquid crystal display 6 including an amorphous polymeric compensator layer 50 and constraint 40 in accordance with another embodiment of the present invention. Also shown are the switchable liquid crystal 10, an alignment layer 20, a TFT (thin film transistor) layer 30, and a color filter array 35. In this embodiment layer 50 is on the other side of the constraint 40 as compared to FIG. 2A.

Figure 2C:
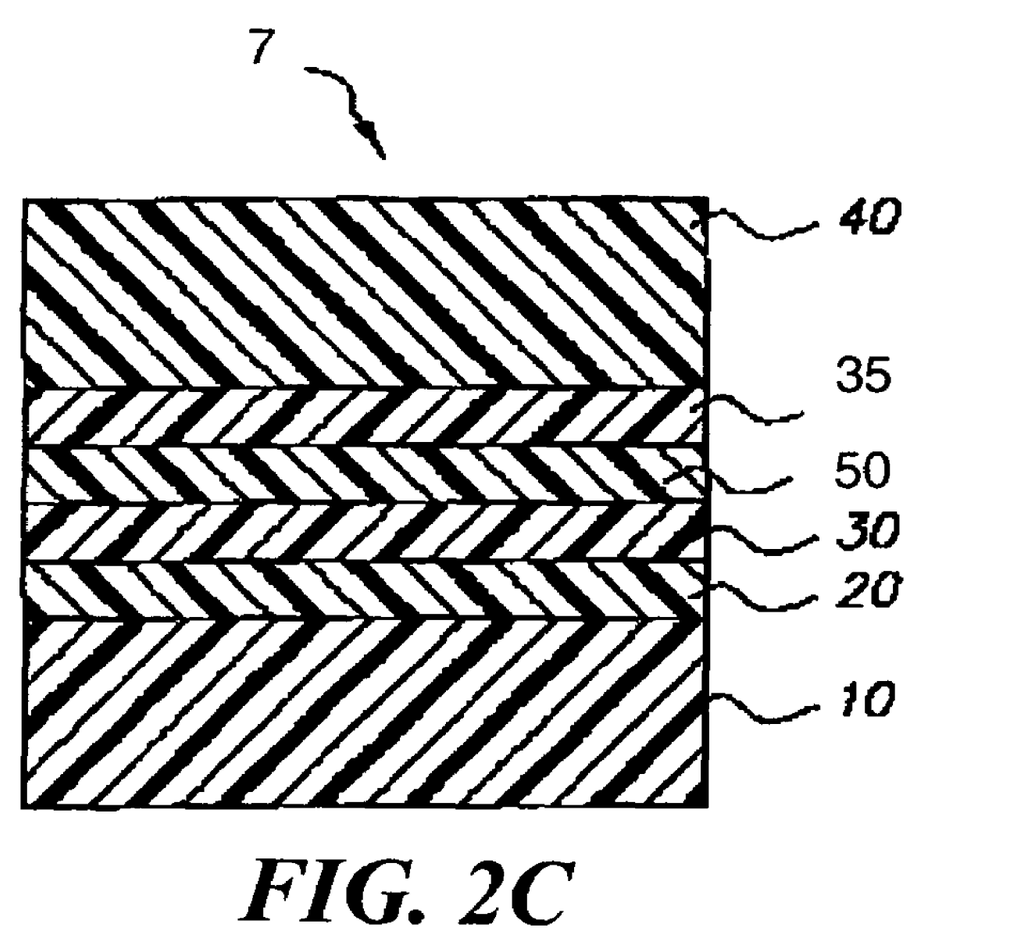
FIG. 2C is a cross-sectional schematic of an embodiment of the invention with the amorphous polymeric compensator layer on the side of the color filter array adjacent to the liquid crystal.

FIG. 2C shows a cross-sectional schematic of part of another liquid crystal display 7 including an amorphous polymeric compensator layer 50 in accordance with another embodiment of the present invention. Also shown are the constraint 40, switchable liquid crystal 10, an alignment layer 20, a TFT (thin film transistor) layer 30, and a color filter array 35. This embodiment is characterized by the compensator layer 50 being formed on the liquid crystal 10 side of the color filter array 35.

The amorphous polymeric compensator layer 50 of FIGS. 2A-2C may have an out-of-plane birefringence more negative than −0.005, and the combined in-plane retardation (Re) of layers 20, 30, 35, 40 and 50 is from +20 to −20 nm and the out-of-plane retardation (Rth) of layer 50 is more negative than −20 nm.

Alternately, the amorphous polymeric compensator layer 50 has an out-of-plane birefringence more positive than +0.005, and the combined in-plane retardation (Re) of layers 20, 30, 35, 40 and 50 is from +20 to −20 nm and the out-of-plane retardation (Rth) of layer 50 is more positive than +20 nm.

The thickness of the compensation layer is usually less than 30 μm. Typically it is from 0.1 μm to 20 μm. Conveniently it is from 1.0 μm to 10 μm and desirably from 2 μm to 8 μm.

In the case of negative birefringence, the compensator layer is suitably of sufficient thickness so that the out-of-plane retardation of the second layer is more negative than −20 nm. Typically it is from −600 to −60 nm. Conveniently it is from −500 to −100 nm and desirably from −400 to −150 nm.

In the case of positive birefringence, the compensator layer is suitably of sufficient thickness so that the out-of-plane retardation of the second layer is more negative than +20 nm. Typically it is from +600 to +60 nm. Conveniently it is from +500 to +100 nm and desirably from +400 to +150 nm.

Figure 3A:
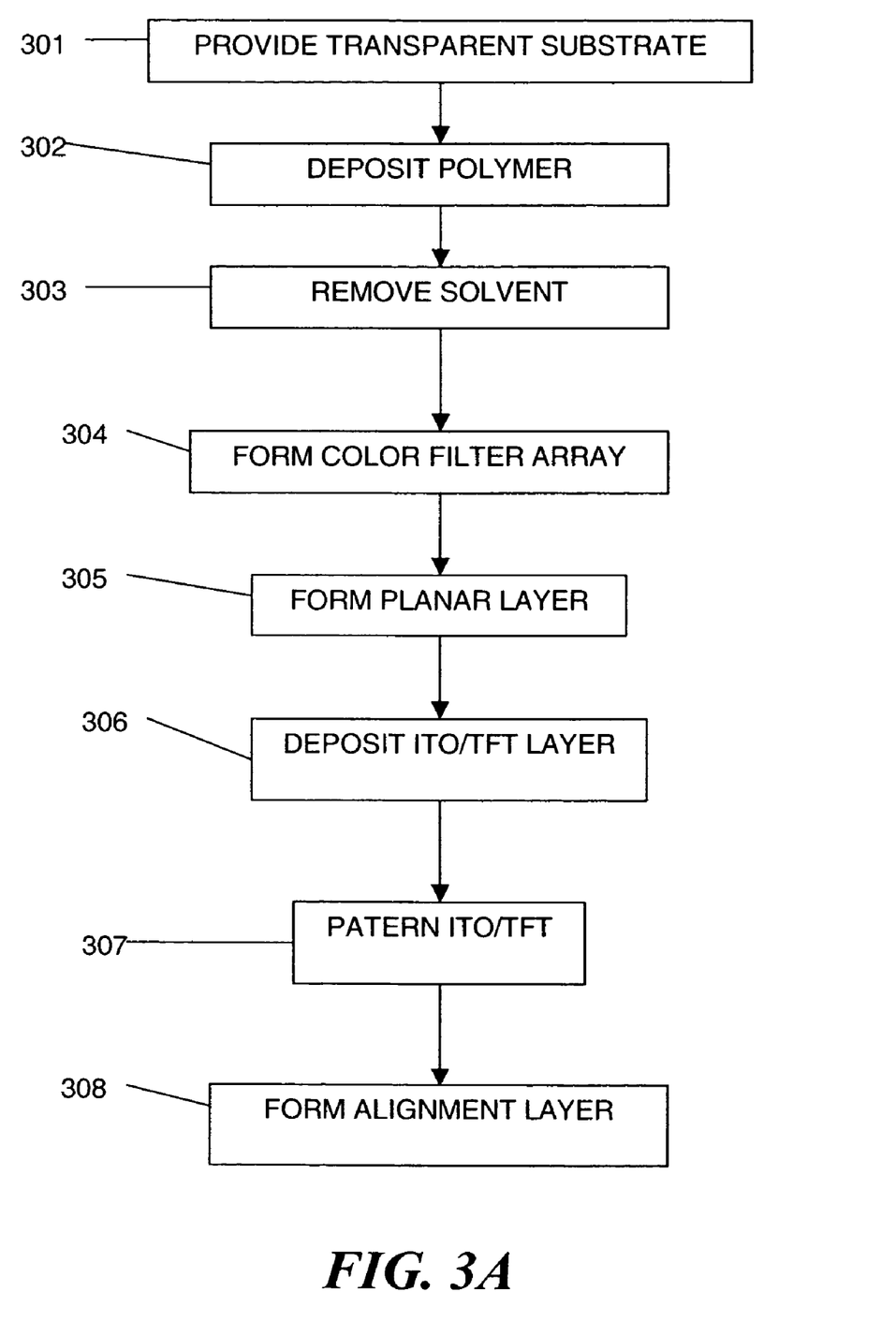
FIG. 3A is a simplified process diagram for constructing the device of FIG. 2B.

FIG. 3A is a simplified process diagram for constructing the device of FIG. 2B according to an embodiment of the invention. The transparent substrate 40 is provided at step 301, and the amorphous polymer in solvent is deposited thereon at step 302. The solvent is removed at step 303 to define the compensation layer 50. The color filter array 35 is formed on the compensator 50 at step 304, and then a polarization layer (not shown in FIG. 2B) is generally formed due to the irregular surface of the color filter array 35. Then, at steps 306 and 307, a layer of indium tin oxide (ITO) or TFT layer is deposited and patterned to define layer 30. Finally, at step 308, the alignment layer 20 is formed.

Figure 3B:
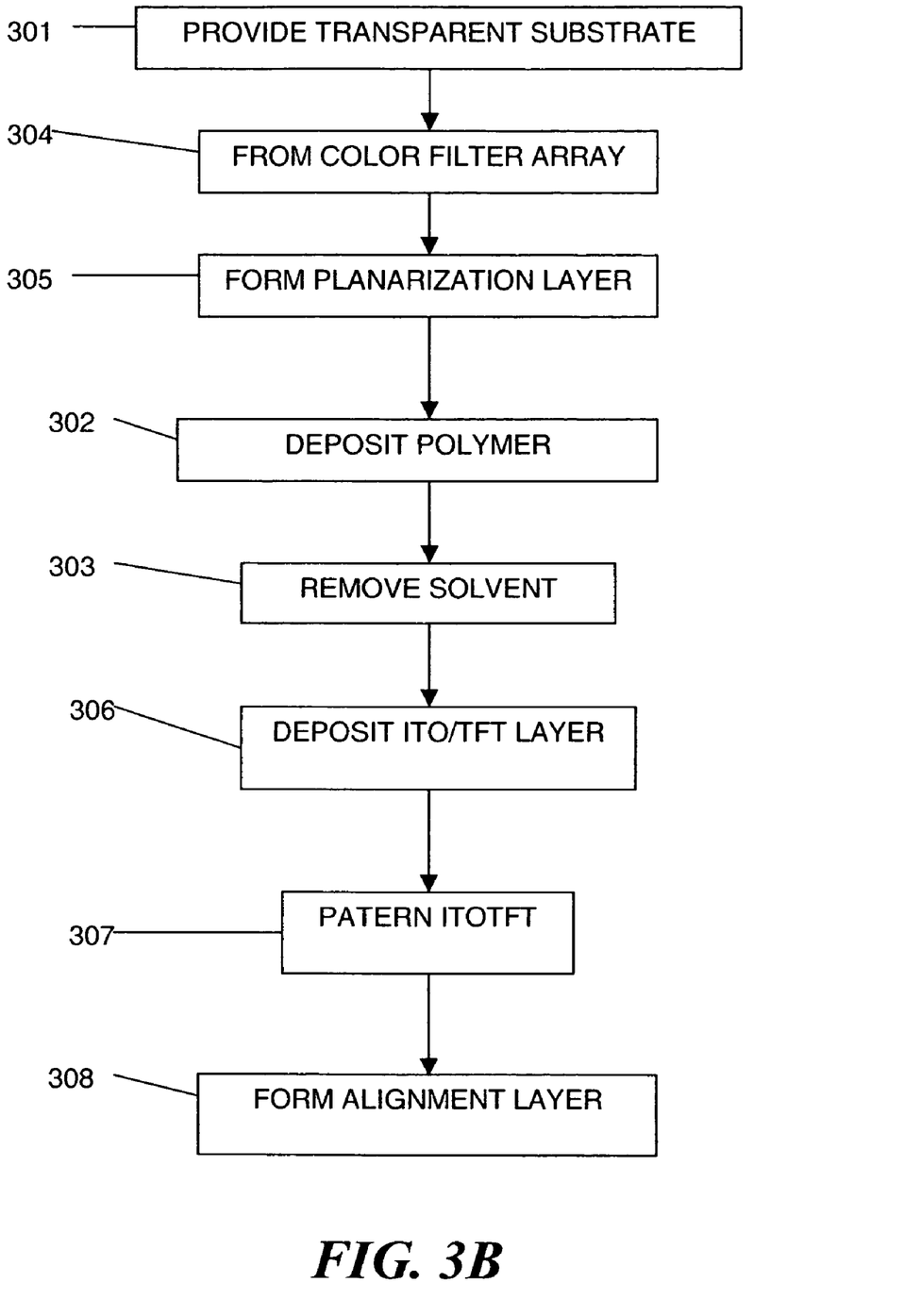
FIG. 3B is a simplified process diagram for constructing the device of FIG. 2C.

FIG. 3B is a simplified process diagram for constructing the device of FIG. 2C according to an embodiment of the invention. The transparent substrate 40 is provided at step 301, and the amorphous polymer in solvent is deposited thereon at step 302. The solvent is removed at step 303 to define the compensation layer 50. The color filter array 35 is formed on the compensator 50 at step 304, and then a polarization layer (not shown in FIG. 2C) is optionally formed to compensate for the irregular surface of the color filter array 35. For example, the planarization layer may be preferred to equalize the thickness (retardation) of the amorphous polymer formed in the subsequent steps 302 and 303. Then, at steps 306 and 307, a layer of indium tin oxide (ITO) or TFT is deposited and patterned to define layer 30. Finally, at step 308, the alignment layer 20 is formed.

Amorphous polymeric materials are used for the optical compensator layer. In this case amorphous means that the optical compensator would not produce any sharp diffraction peaks when exposed to X-ray diffraction analysis. Crystalline polymers, liquid crystal molecules and crystalline inorganic materials would produce such sharp peaks when subjected to such X-ray diffraction analysis. Such amorphous materials are desirably suitable to be solvent cast or coated such as TAC, polycarbonates, cyclic polyolefins, polyesters, and polyimides.

Typical lamination uses pressure sensitive adhesive layers of greater than 4 micrometers in thickness. As used herein, the term contiguous means without the use of any intervening laminating adhesive layer and therefore contemplates the possible use of only a very thin (0.2 μm or less) adhesion promoting layer or an adhesion promoting surface treatment such as corona discharge, plasma glow discharge, or flame treatment. Other adhesion enhancing methods could be employed as known to those skilled in the art.

The compensator layer will typically be solvent coated onto the constraint interior surface which faces toward the liquid crystal of the cell. This solvent coating could be accomplished by spin coating, hopper coating, gravure coating, wire bar coating, spray coating, or other coating methods known to those skilled in the art.

In certain embodiments of the invention, the compensator layer is coated from a solution containing a polymer that yields high negative birefringence upon solvent coating. In other embodiments, the compensator layer is coated from a solution containing a polymer that yields high positive birefringence upon solvent coating.

Compared to WO 01/31394, the compensator layer(s) can be applied onto any and/or all of the four surfaces provided by the two liquid crystal constraints (be they glass or some other very low birefringence material). Further, the applied layers are not limited in thickness due to their coloration since they are transparent. Finally the materials suitable for these contiguous amorphous polymeric compensator layers are much broader than the aromatic polyimides of '394. A wide variety of amorphous, high glass transition temperature, polymeric materials are identified that will serve this purpose.

The invention is described in more detail by referring to the drawings as follows.

Among the liquid crystal cell arrangements useful with the invention are Vertically Aligned (VA) and In-Plane Switching (IPS) cells. In the Vertically Aligned arrangement, the liquid crystal display is one in which electric field is applied in a direction perpendicular to or vertical with respect to the cell plane and the direction of the liquid crystal optic axis is substantially perpendicular to or vertical with respect to the liquid crystal cell plane without an applied field. Therefore, the incoming light essentially does not see the birefringence through the liquid crystal cell. This state is termed the "dark state". In the In-plane switching arrangement, the electric field is applied in the direction of the liquid crystal plane and the direction of the liquid crystal optic axis is changed upon application of the electric field while remaining substantially within the plane of the cell.

The present invention is further illustrated by the following non-limiting examples of its practice.

The aromatic polyesters used herein can be prepared using any suitable or conventional procedure, for example condensation, addition, anionic, cationic or other common methods of synthesis can be employed. The procedure used herein followed that outlined by P. W. Morgan in Condensation Polymers: By Interfacial and Solution Methods, Interscience, New York City, N.Y. (1965).

Polymers Having Negative Out-of-Plane Birefringence

To produce negative birefringence (negative retardation), polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone will be used, such as polyesters, polycarbonates, polyimides, polyetherimides, and polythiophenes. One could also add fillers and non-polymeric molecules to these polymers for this contiguous layer.

A chromophore is defined as an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77).

Typical chromophore groups include vinyl, carbonyl, amide, imide, ester, carbonate, aromatic (i.e. phenyl, naphthyl, biphenyl, thiophene, bisphenol), sulfone, and azo or combinations of these chromophores. A non-visible chromophore is one that has an absorption maximum outside the range of 400-700 nm.

The glass transition temperature (Tg) of the polymers used in the compensator layer is significant. Tg values above 180° C. are desirable to achieve preferred results.

EXAMPLE 1

The glass transition temperature of polymer I was measured by differential scanning calorimetry and found to be 289° C., Poly(4,4'-hexahydro-4,7-methanoindan-5-ylidene bisphenol)terephthalate Polymer I

When polymer I was spun cast onto a glass substrate (10% solids in dichloroethane), it showed the following optical retardations. Re, Rth and the polymer I layer thickness were measured with an ellipsometer (model M2000V, J.A. Woollam Co.) at 550 nm wavelength.

TABLE I

| Polymer II Layer thickness (µm) | Re, In-Plane Retardation (nm) | Rth, Out-of-Plane Retardation (nm) |
|---|---|---|
| 3.4 | 0.2 | −74 |

EXAMPLE 2

The glass transition temperature of polymer II was measured by differential scanning calorimetry and found to be 250° C.

Poly(4,4'-isopropylidene-2,2'6,6'-tetrachlorobisphenol)terephthalate-co-isophthalate Polymer II

When polymer II was spun cast onto glass (10% solids in dichloroethane), it showed the following optical retardations. Re, Rth and the polymer II layer thickness were measured with an ellipsometer (model M2000V, J.A. Woollam Co.) at 550 nm wavelength.

TABLE II

| Polymer III Layer thickness (µm) | Re, In Plane Retardation (nm) | Rth, Out of Plane Retardation (nm) |
|---|---|---|
| 2.8 | 0.8 | −66 |

EXAMPLE 3

The glass transition temperature of polymer III was measured by differential scanning calorimetry and was found to be 270° C.

Poly(4,4'-hexafluoroisopropylidene-bisphenol-co-4,4'-(2-norbornylidene)bisphenol) terephthalate-co-isophthalate

Polymer III

When polymer III was spun cast onto glass (10% solids in 50% propylacetate 50% toluene), it showed the following optical retardations. Re, Rth and the polymer III layer thickness were measured with an ellipsometer (model M2000V, J.A. Woollam Co.) at 550 nm wavelength.

TABLE III

| Polymer IV Layer thickness (µm) | Re, In Plane Retardation (nm) | Rth, Out of Plane Retardation (nm) |
|---|---|---|
| 5.9 | 0.2 | −221 |

Other specific polymers that could be used include:

Poly(4,4'-hexafluoroisopropylidene)-bisphenol-co-(2-norbornylidene)-bisphenol terephthalate. (60/40)

Poly(4,4'-hexahydro-4,7-methanoindan-5-ylidene)-bisphenol-co-(4,4'-isopropylidene-2,2',6,6'-tetra-bromo)-bisphenol terephthalate. (50/50)

Poly(4,4'-hexafluoroisopropylidene-bisphenol) terephthalate-co-isophthalate where x=90, y=10
and a=70, b=30

Poly(4,4'-isopropylidene-bisphenol-co-4,4'-(2-norbornylidene)bisphenol)terephthalate-co-isophthalate A series of polymers were analyzed for their glass transition temperatures and out of plane birefringence values. It was found that the more desirable polymers for this invention had glass transition temperatures above 180° C. Those with lower glass transition temperatures were found to generally have birefringence values less negative than −0.005.

Polymers Having Positive Out-of-Plane Birefringence

Examples of such polymers would include materials that have non-visible chromophores off of the polymer backbone. Such non-visible chromophores would include: vinyl, carbonyl, amide, imide, ester, carbonate, sulfone, azo, and aromatic heterocyclic and carbocyclic groups (e.g. phenyl, naphthyl, biphenyl, terphenyl, phenol, bisphenol A, and thiophene). In addition, combinations of these non-visible chromophores could be desirable (i.e. copolymers).

The glass transition temperature (Tg) of the polymers used in the compensator layer is significant. Tg values above 160° C. are desirable to achieve preferred results.

Specific polymers that could be used include:

Poly(4 vinylbiphenyl)

Poly(4 vinylphenol)

Poly(N-vinylcarbazole)

Poly(methylcarboxyphenylmethacrylamide)

11

Poly[(1-acetylindazol-3-ylcarbonyloxy)ethylene]

Poly(phthalimidoethylene)

Poly(4-(1'-hydroxy-1-methylpropyl)styrene)

Poly(2-hydroxymethylstyrene)

Poly(2-dimethylaminocarbonylstyrene)

12

Poly(2-phenylaminocarbonylstyrene)

Poly(3-(4-biphenylyl)styrene)

Poly(4-(4-biphenylyl)styrene)

One could also consider using copolymers of two or more of the foregoing polymers having positive out-of-plane birefringence.

EXAMPLE 4

Poly(N-vinylcarbazole) was found to have a Tg of 172° C. by differential scanning calorimetry (DSC).

Poly(N-vinylcarbazole) (15% solids in toluene) was spun cast onto a glass substrate. $R_e$ and $R_{th}$ of this sample were measured with an ellipsometer (model M2000V, J.A. Woollam Co.) at $\lambda=550$ nm. Results are shown in TABLE IV.

TABLE IV

| Layer thickness (μm) | $R_e$, In-Plane Retardation (nm) | $R_{th}$, Out-of-Plane Retardation (nm) |
| --- | --- | --- |
| 3 | 0.2 | +65 |

The invention has been described in detail with particular reference to certain preferred embodiments thereof, but it will be understood that variations and modifications can be effected within the scope of the invention.

PARTS LIST 5 compensator/constraint according to the present invention
10 liquid crystal
20 alignment layer
30 transparent conductive layer
40 constraint
50 polymeric layer having high birefringence
200 polymeric layer having high birefringence
300 constraint
400 constraint
500 polarizer
550 polarizer
600 liquid crystal
700 liquid crystal display

What is claimed is:

1. A liquid crystal cell comprising a liquid crystal, a constraint, and one or more compensator layers interposed between the liquid crystal and the constraint, each compensator layer containing a transparent amorphous polymeric birefringent material having
   a) an out-of plane birefringence more negative than −0.005, and a glass transition temperature (Tg) above 180° C., that includes in the backbone a non-visible chromophore containing a vinyl, carbonyl, amide, ester, carbonate, sulfone, azo, or aromatic group, and that does not contain a chromophore off of the backbone, wherein an overall in-plane retardation (Re) of all of the one or more compensator layers is from +20 to −20 nm, and the out-of-plane retardation (Rth) of at least one of the one or more compensator layers is more negative than −20 nm; or
   b) an out-of plane birefringence more positive than 0.005, a glass transition temperature (Tg) above 160° C., and that contains off the backbone a non-visible chromophore containing a vinyl, carbonyl, amide, ester, carbonate, aromatic, azo or sulfone group, wherein an overall in-plane retardation (Re) of all of the one or more compensator layers is from +20 to −20 nm, and the out-of-plane retardation (Rth) of at least one of the one or more compensator layers is more positive than 20 nm;
   wherein amorphous means the optical compensator does not produce any sharp diffraction peaks when exposed to X-ray diffraction analysis.

2. The cell of claim 1, wherein the transparent amorphous polymeric birefringent material has an out-of plane birefringence more negative than −0.005.

3. The cell of claim 1, wherein the compensator layer comprises one selected from the group consisting of (1) poly(4,4'-hexafluoroisopropylidene-bisphenol) terephthalate-co-isophthalate, (2) poly(4,4'-hexahydro -4,7-methanoindan-5-ylidene bisphenol) terephthalate, or (3) poly(4,4'-isopropylidene -2,2'6,6'-tetrachlorobisphenol) terephthalate-co-isophthalate, (4) poly(4,4'-hexafluoroisopropylidene)-bisphenol-co-(2-norbornylidene)-bisphenol terephthalate; (5) poly(4,4'-hexahydro-4,7-methanoindan-5-ylidene)-bisphenol -co-(4,4'-isopropylidene-2,2',6,6'-tetrabromo)-bisphenol terephthalate; or (6)poly(4,4'-isopropylidene-bisphenol-co-4,4'-(2-norbornylidene) bisphenol) terephthalate-co-isophthalate, (7) poly(4,4'-hexafluoroisopropylidene-bisphenol-co-4,4'-(2-norbornylidene) bisphenol) terephthalate-co-isophthalate , or (8) copolymers of any two or more of the foregoing.

4. The cell of claim 1, wherein the transparent amorphous polymeric birefringent material has an out-of plane birefringence more positive than 0.005.

5. The cell of claim 4, wherein said amorphous is one selected from the group consisting of (A) poly (4 vinylphenol), (B) poly (4 vinylbiphenyl), (C) poly (N-vinylcarbazole), (D) poly(methylcarboxyphenylmethacrylamide), (E) poly[(1-acetylindazol-3-ylcarbonyloxy)ethylene], (F) poly (phthalimidoethylene), (G) poly(4-(1-hydroxy-1-methylpropyl)styrene), (H) poly(2-hydroxymethylstyrene), (I) poly(2-dimethylaminocarbonyistyrene), J) poly(2-phenylaminocarbonylstyrene), (K) poly(3-(4-biphenylyl) styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstyrene), and (and R) poly(2,4,6-trimethylstyrene)or (S) copolymers of any two or more of the foregoing.

6. The cell of claim 1, wherein the non-visible chromophore group includes a heterocyclic or carbocyclic aromatic group.

7. The cell of claim 1, wherein at least one of the one or more compensator layers is contiguous with the constraint.

8. The cell of claim 7, wherein the constraint is glass.

9. The cell of claim 1, further comprising a color filter array located between the constraint and the liquid crystal.

10. The cell of claim 9, wherein at least one of the one or more compensator layers is located between the color filter array and the liquid crystal.

11. The cell of claim 9, wherein the at least one of the one or more compensator layers is located between the color filter array and the constraint.

12. A process for forming a liquid crystal cell comprising forming one or more compensator layers between a constraint and a liquid crystal, each compensator layer containing a transparent amorphous polymeric birefringent material having
   a) an out-of plane birefringence more negative than −0.005, and a glass transition temperature (Tg) above 180° C., that includes in the backbone a non-visible chromophore containing a vinyl, carbonyl, amide, ester, carbonate, sulfone, azo, or aromatic phenyl, naphthyl, biphenyl, bisphenol, or thiophene group, and that does not contain a chromophore off of the backbone, wherein an overall in-plane retardation (Re) of all of the one or more compensator layers is from +20 to −20 nm, and the out-of-plane retardation (Rth) of at least one of the one or more compensator layers is more negative than −20 nm; or
   b) an out-of plane birefringence more positive than 0.005, a glass transition temperature (Tg) above 160°, and that contains off the backbone a non-visible chromophore containing a vinyl, carbonyl, amide, ester, carbonate, aromatic, azo or sulfone group, wherein an overall in-plane retardation (Re) of all of the one or more compensator layers is from +20 to −20 nm, and the out-of-plane retardation (Rth) of at least one of the one or more compensator layers is more positive than 20 nm;

wherein amorphous means the optical compensator does not produce any sharp diffraction peaks when exposed to X-ray diffraction analysis.

13. The process of claim 12, comprising coating the polymer in solvent onto an interior surface of the constraint.

14. The process of claim 12, comprising forming a color filter array on an interior surface of the constraint, and coating the polymer in solvent over the color filter array opposite the constraint.

15. The process of claim 12, wherein the constraint is glass.

* * * * *